UNITED STATES PATENT OFFICE.

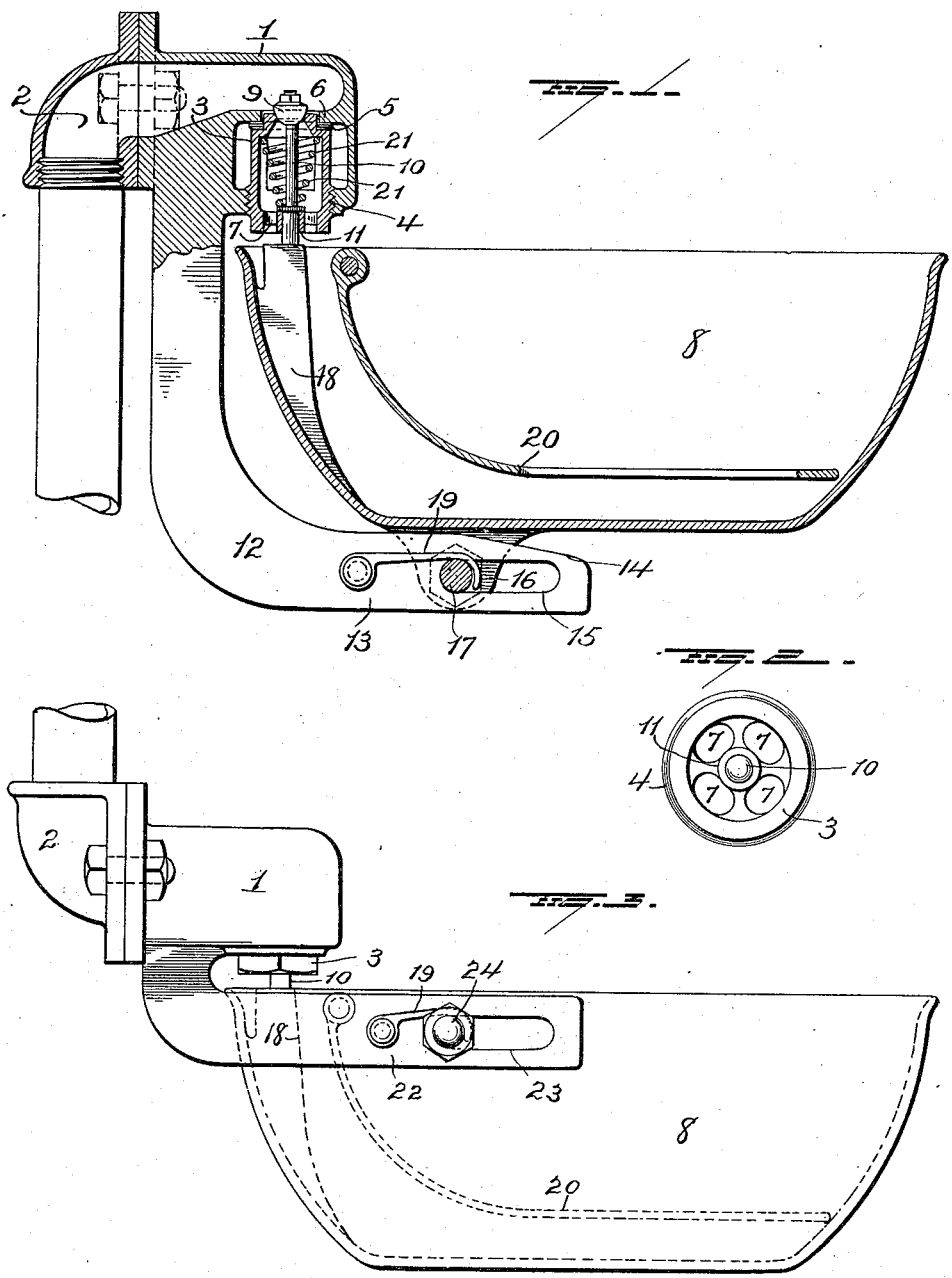

HUGO C. RASSMANN, OF BEAVER DAM, WISCONSIN.

WATERING DEVICE FOR CATTLE.

1,276,813.          Specification of Letters Patent.          Patented Aug. 27, 1918.

Application filed August 15, 1917.   Serial No. 186,313.

*To all whom it may concern:*

Be it known that I, HUGO C. RASSMANN, a citizen of the United States, and a resident of Beaver Dam, in the county of Dodge and State of Wisconsin, have invented certain new and useful Improvements in Watering Devices for Cattle, and do hereby declare the following to be a full, clear, and exact description of the invention, such as will enable others skilled in the art to which it appertains to make and use the same.

This invention relates to improvements in watering devices for cattle,—one object of the invention being to provide a device of this character which shall be simple in construction; which shall be sanitary in every respect, and which shall be operable by the animal to control the water supply by movement of the bowl and without the use of separate lever mechanism.

With this and other objects in view, the invention consists in certain novel features of construction and combinations of parts as hereinafter set forth and pointed out in the claims.

In the accompanying drawings, Figure 1 is a view partly in section and partly in elevation showing an embodiment of my invention. Fig. 2 is a detail view showing the water discharge portion of the fount, and Fig. 3 is a view of a modification.

1 represents a fount with which a coupling 2 is adjustably connected for the reception of a water supply pipe which may be led from either above or below the fount.

A valve cage 3 is located within the outlet portion of the fount and provided with a threaded part 4 to screw into said outlet portion of the fount,—a suitable packing ring 5 being disposed between the upper portion of said valve cage and an annular shoulder 6 in the casing of the fount. The lower end of the cage 3 is provided with a plurality of openings 7 through which water may be discharged into the bowl 8 located under the same. The port at the upper end of the cage 3 is normally closed by a valve 9 and the stem 10 of this valve projects downwardly through the cage 3 and through a guide 11 in the threaded or nut portion 4 thereof,—said stem depending below said cage.

The fount 1 is provided with an L-shaped arm 12 which may be made integral therewith and form a part thereof. The horizontal member 13 of this arm is beveled as at 14 and is also provided with an elongated slot 15. Lugs, such as shown at 16, depend from the bottom of the bowl 8 and carry a pivot pin 17 mounted in the slot 15 of the arm member 13. In the drawing, lugs 16 are shown as being located near the inner end of the bowl but they may be located nearer the center of the bottom of the bowl if desired.

The bowl 8 is provided interiorly near its inner end with a finger or projection 18 which normally engages the depending end of the valve stem 10. The bowl is retained against accidental movement from its normal horizontal position as shown in Fig. 1, by means of a latch 19 which is pivotally attached at one end to the arm member 13 and made hooked shape at its other end to engage the pivot pin 17.

If desired, a guard 20 may be mounted within the bowl 8 so as to cause the animal to drink from the portion of the bowl nearest him so that in the act of drinking he will depress the bowl, causing it to turn on its pivotal support and the finger or projection 18 to press upwardly against the valve stem 10 and thus open the valve,—which latter is maintained normally closed by means of a spring 21 located within the cage 3 and engaging at one end, a suitable projection on the valve stem. After the animals have learned to use the bowl in the manner to cause it to tilt and thus operate the valve, the guard 20 may be removed.

When it is desired to tilt the bowl sufficiently to discharge its contents and to facilitate the cleaning of the bowl, the operator after raising the latch 19 will slide the bowl outwardly so as to free the same from the fount discharge portion and then permit it to turn with the pivot pin 17 at the outer end of the elongated slot 15.

Instead of providing the pin and slot connection between the bowl and the fount below the bowl, such pin and slot construction may be provided at or near the upper edge of the bowl, in which case the arm member of the fount may be bifurcated so as to partially embrace the bowl and the members of such bifurcated arm may be slotted and the pivot pins made to project laterally from the bowl at diametrically opposite points, as illustrated in Fig. 3. In this figure the arm members are indicated at 22, the slots at 23 and the pivot pins at 24.

Slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:

1. In a watering device, the combination of a valved fount and a bowl, a projection within the bowl normally engaging the stem of the valve of the valved fount when the bowl is in horizontal position and adapted to cause the valve to be opened when the bowl is tilted, and a pin-and-slot connection between the bowl and the fount whereby the bowl may be tilted, and moved horizontally and swung downwardly.

2. In a watering device, the combination of a valved fount and a bowl, a pin on one of said parts and the other part having an elongated slot to receive said pin, a latch to engage said pin and hold the same in normal position, and a projection in said bowl to engage the stem of the valve of the valved fount when the bowl is in normal position.

In testimony whereof, I have signed this specification in the presence of two subscribing witnesses.

HUGO C. RASSMANN.

Witnesses:
H. R. VETTER,
E. J. LAWRENCE.

Copies of this patent may be obtained for five cents each, by addressing the "Commissioner of Patents, Washington, D. C."